S. H. HALL.
FEED REGULATOR FOR CENTRIFUGALIZING MACHINES AND THE LIKE.
APPLICATION FILED JAN. 28, 1914.
1,121,622.
Patented Dec. 22, 1914.
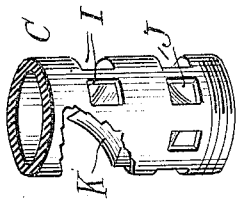
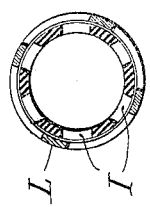
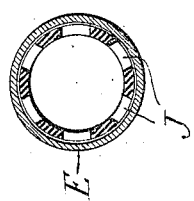
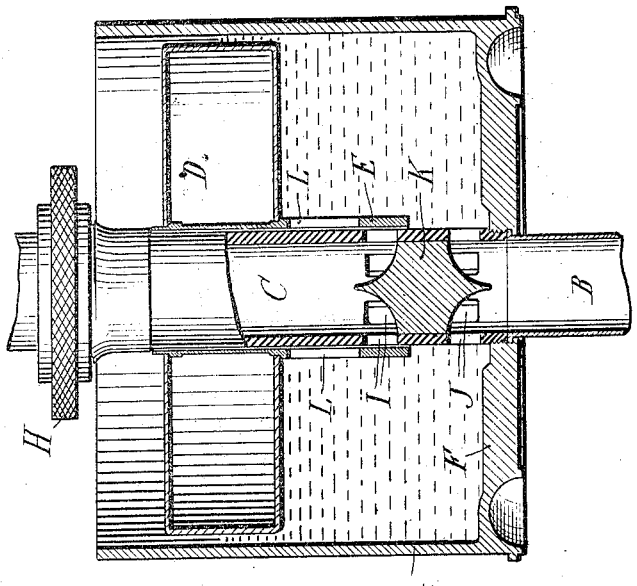
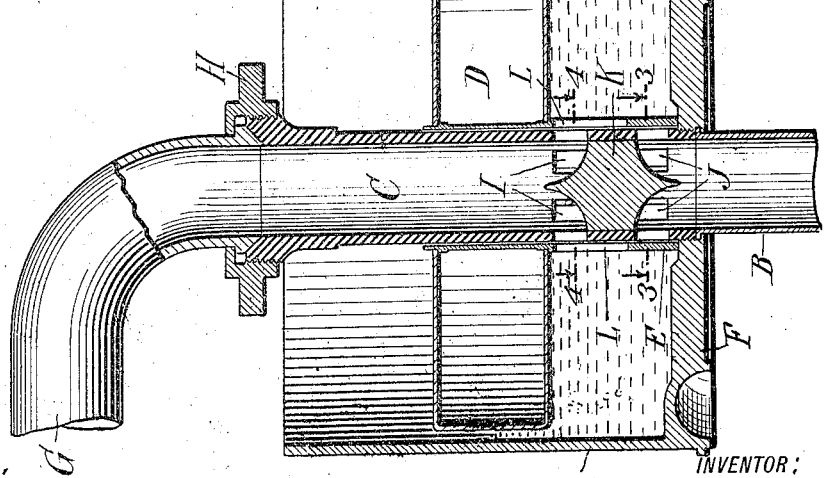
WITNESSES:
M. A. Bill
R. S. Schiff
INVENTOR:
Selden H. Hall,
BY
Fenning, Davis & Goldsbrough
ATTORNEYS.

UNITED STATES PATENT OFFICE.

SELDEN H. HALL, OF POUGHKEEPSIE, NEW YORK, ASSIGNOR TO THE DE LAVAL SEPARATOR COMPANY, OF NEW YORK, N. Y., A CORPORATION OF NEW JERSEY.

FEED-REGULATOR FOR CENTRIFUGALIZING-MACHINES AND THE LIKE.

1,121,622.     Specification of Letters Patent.     Patented Dec. 22, 1914.

Application filed January 28, 1914. Serial No. 814,882.

*To all whom it may concern:*

Be it known that I, SELDEN H. HALL, a citizen of the United States, residing at Poughkeepsie, county of Dutchess, State of New York, have invented certain new and useful Improvements in Feed-Regulators for Centrifugalizing-Machines and the like; and I do hereby declare the following to be a full, clear, and exact description of the invention, such as will enable others skilled in the art to which it appertains to make and use the same.

The present invention relates to means for feeding a liquid from a source of supply into a vessel in which the liquid is to be treated (as, for instance, a liquid centrifugalizing machine) without drawing air into the vessel. A typical instance, wherein it is thus desirable to exclude the air from the treating vessel, continuously supplied with the liquid to be treated, is afforded, for instance, by the centrifugalizing machine illustrated in my co-pending application, Ser. No. 756,835, wherein the liquid to be centrifugalized is supplied to the machine through the intermediacy of a feed cup. For purposes of illustration, I have illustrated, in the accompanying drawings, a feed cup or supply receptacle of a kind adapted to provide a continuous inflow of liquid to such a machine, while preventing the simultaneous ingress of air with the liquid.

In the accompanying drawings,—Figure 1 represents, in vertical section, a feed cup or receptacle constructed in accordance with my invention, the regulating valve thereof being illustrated as in its lowermost position appropriate to the interruption of the feed; Fig. 2 represents a like view, with the regulating valve in its uppermost position, that is to say, giving unrestricted passage of the liquid from the feed cup into the discharge pipe thereof; Fig. 3 represents a cross-sectional view on the line 3—3 of Fig. 1; Fig. 4 represents a cross-sectional view on the line 4—4 of Fig. 1. Fig. 5 represents a fragmentary outside view.

Similar letters of reference indicate similar parts throughout the several views.

Referring to the drawings,—A indicates a feed cup of the kind appropriate to centrifugalizing machines, said feed cup supporting the discharge tube B which, as usual, is adapted to convey the full milk or other liquid to be treated into the centrifugalizing machine. Secured into a socket in the bottom F of the feed cup is a tube C, containing a stationary plug or abutment. Above and below the abutment, the walls of the tube C are provided with two sets of ports I and J, separated from each other by the said plug; so that liquid entering from the pipe C must pass through the ports I in order to gain access to the interior of the feed cup A, and must pass through the ports J in order to gain access to the discharge pipe B.

To regulate the ports I and J, a ring valve E is provided, which surrounds the tube C and is connected to the float D in any suitable manner, as, for instance, by the bars L. To the top of the tube C a supply pipe G may be connected, by the releasable socket and spigot coupling shown, or in any other suitable manner.

The mode of operation of the apparatus is as follows: The position of the float D, in the feed tank is, of course, determined, within the limits of its upward and downward movement, by the level of the liquid within the feed cup. When the ring valve E is at its lowermost position, as shown in Figs. 1 and 3, the liquid supplied by the tube C enters the open ports I and rises in the feed cup until the level of the liquid reaches the float D, whereupon the float begins to rise. The rising float raises the ring valve E and opens the ports J thereby allowing the liquid to pass through the ports J and thence into the discharge pipe B into the centrifugalizing machine or other vessel. During this feed of liquid to the machine, the entrance of air into the discharge ports J and into the discharge tube B is prevented, inasmuch as the liquid level is always higher than the ports J during the feeding operation.

If the quantity of liquid supplied through the pipes G and C and the ports I is greater than the centrifugalizing machine or other treating vessel can take care of, the excess will remain in the feed cup A and will raise the float D and with it the valve E toward the extreme upward position shown in Fig. 2; thus partially or almost completely, as the case may require, closing the ports I and shutting off the entrance of liquid into the feed cup. If, on the other hand, the centrifugalizing machine or other treating vessel tends to withdraw from the feed cup A a greater quantity of liquid than is supplied by the pipe G the excess will be drawn from the cup A. This will cause the float D and the valve E to descend, thereby partially closing the ports J and thus throttling the feed to the machine. It will be evident, therefore, that in all positions of the valve D, and whether the centrifugalizing machine or other vessel is operating under conditions which require either a greater or a lesser influx of liquid from the feed cup, a sealing body of the liquid is always present in the feed cup A sufficient to prevent the indrawing of air with the liquid supplied to the machine.

While the specific construction shown in the drawing is peculiarly adapted to successful use, other equivalent constructions may be employed without departing from the spirit of the invention, which has the conjoint function of preventing either an overflow of the liquid with consequent waste thereof, or indrawing of air with said liquid into the machine. For instance, other forms of valve may be substituted for the ring valve E and other forms of connection than the rigid bars L may be provided between the float and the valve. Accordingly, it will be understood that, in the appended claims, the structure defined therein is to have a correspondingly comprehensive interpretation.

Having thus described my invention, what I claim is:

1. A receptacle for feeding liquid into a liquid treating apparatus, without drawing air thereinto, said receptacle being provided with a discharge tube leading into the apparatus to be supplied, a valve at the inlet to said discharge tube, and a float in the receptacle connected to said valve and adapted to so move the valve as to gradually close the inlet to the discharge tube as the level of liquid in the feed receptacle approaches a predetermined low limit above the liquid sealing level of said inlet ports.

2. A receptacle for feeding liquid into a liquid treating apparatus, without drawing air thereinto, said receptacle being provided with a discharge tube leading into the apparatus to be supplied, a pipe supplying liquid to the receptacle, and a valve connected with a float in the receptacle and governing the outlet from the supply pipe and the inlet to the discharge tube, the relationship of the ports being such that the said inlet shall remain sealed against air admissions in all positions of the valve.

3. A receptacle for feeding liquid into a liquid treating apparatus, without drawing air thereinto, said receptacle being provided with a discharge tube leading into the apparatus to be supplied, a supply tube leading into the feed receptacle and in alinement with the discharge tube, a plug or abutment intermediate of the said supply tube and the said discharge tube, and a float-controlled valve governing respectively the entrance of liquid from the supply tube and the egress of liquid into the discharge tube.

4. A receptacle for feeding liquid into a liquid treating apparatus, without drawing air thereinto, said receptacle being provided with a discharge tube leading into the apparatus to be supplied, a supply tube leading into the feed receptacle and in alinement with the discharge tube, a plug or abutment intermediate of the said supply tube and the said discharge tube, and a float-controlled valve governing respectively the entrance of liquid from the supply tube and the egress of liquid into the discharge tube, said valve being of the ring type and adapted to move up and down exteriorly of the plug.

5. A receptacle for feeding liquid into a liquid treating apparatus, without drawing air thereinto, said receptacle being provided with a discharge tube leading into the apparatus to be supplied, an inlet tube for supplying liquid to the feed receptacle, said inlet tube being in alinement with said discharge tube, a plug or abutment interposed between the outlet ports of the feed tube and inlet ports of the discharge tube, an annular sliding valve governing both of said ports and encircling the plug, and a float sleeved upon the feed tube and connected with the valve.

In testimony whereof I affix my signature, in presence of two witnesses.

SELDEN H. HALL.

Witnesses:
CHARLES L. POWELL,
S. B. ROCKEFELLER.